US012802562B2

(12) United States Patent
Malhan et al.

(10) Patent No.: US 12,802,562 B2
(45) Date of Patent: Nov. 17, 2026

(54) SYSTEM AND METHOD FOR TRAFFIC SIGNAL CONTROL WITH INTEGRATED PRIORITY AND ROUTING

(71) Applicant: DENSO International America, Inc., Southfield, MI (US)

(72) Inventors: Rajesh Malhan, Troy, MI (US); Yichen Li, Ann Arbor, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 19/083,494

(22) Filed: Mar. 19, 2025

(65) Prior Publication Data

US 2025/0299567 A1 Sep. 25, 2025

Related U.S. Application Data

(60) Provisional application No. 63/567,590, filed on Mar. 20, 2024.

(51) Int. Cl.

| | |
|---|---|
| ***G08G 1/081*** | (2006.01) |
| ***G06N 20/00*** | (2019.01) |
| ***G08G 1/01*** | (2006.01) |

(52) U.S. Cl.

CPC ............. *G08G 1/081* (2013.01); *G06N 20/00* (2019.01); *G08G 1/0116* (2013.01); *G08G 1/0145* (2013.01)

(58) Field of Classification Search

CPC .... G08G 1/081; G08G 1/0116; G08G 1/0145; G08G 1/0112; G08G 1/08; G08G 1/096725; G06N 20/00

See application file for complete search history.

(56) References Cited

U.S. PATENT DOCUMENTS

| | | | | |
|---|---|---|---|---|
| 2016/0334233 | A1* | 11/2016 | Baverstock | B60R 16/0236 |
| 2017/0053529 | A1* | 2/2017 | Yokoyama | G08G 1/0145 |
| 2024/0282194 | A1* | 8/2024 | Lee | G08G 1/081 |

FOREIGN PATENT DOCUMENTS

| | | | |
|---|---|---|---|
| CN | 116662803 | A | 8/2023 |
| CN | 116935667 | A | 10/2023 |

* cited by examiner

*Primary Examiner* — Anne Marie Antonucci
*Assistant Examiner* — Luis G Del Valle
(74) *Attorney, Agent, or Firm* — Harness, Dickey & Pierce, P.L.C.

(57) ABSTRACT

A system and method training local models associated with a roadside device to form sets of model parameters for controlling a portion of a roadway. Each local model is associated with different model type. Parameters are communicated to intermediate serves, are aggregated by model type and communicated to a global server where common models have parameters aggregated together. At a global server global parameters are generated by aggregation. The first global parameters for a first model type and the second global parameters for a second model type are communicated to update the local models by communicating the global parameters through the intermediate servers. The roadside devices are operated with the first global parameters or the second global parameters.

18 Claims, 4 Drawing Sheets

SYSTEM AND METHOD FOR TRAFFIC SIGNAL CONTROL WITH INTEGRATED PRIORITY AND ROUTING

CROSS-REFERENCE TO RELATED APPLICATION

This application claims the benefit of U.S. Provisional Application No. 63/567,590 filed on Mar. 20, 2024. The entire disclosure of the above application is incorporated herein by reference.

TECHNICAL FIELD

The present disclosure relates to a traffic signal controls, and, more particularly, to a system and method for traffic signal control with integrated priority and routing.

BACKGROUND

This section provides background information related to the present disclosure which is not necessarily prior art.

Traffic signal optimization is of sufficient importance in addressing pervasive issues of traffic congestion in urban areas. Traffic congestion is a reduction in traffic flow. As urbanization continues to grow, the demand for efficient transportation systems become increasingly critical. Traffic congestion not only results in extended travel times but also contributes to increased fuel consumption, elevated emissions and overall air quality decline. Traffic congestion also affects economic and social development of cities. To mitigate these challenges, optimizing traffic signals is a pivotal strategy.

Typically, traffic signal optimization lies in its ability to leverage cutting-edge technologies to enhance the efficiency and adaptability of traffic management systems. The development of deep learning, the Internet of Things (IoT) and Reinforcement Learning (RL) has sparked a revolution in traffic control. Deep Learning models, such as Graph Neural Networks (GNN) enable comprehensive understanding of complex traffic patterns, while Reinforcement Learning techniques provide adaptive learning capabilities for dynamic environments. The integration of Federated Learning (FL) further extends the optimization scope, allowing for tailored solutions at the local level.

The burgeoning interest in traffic signal optimization is not merely a response to current challenges but a reflection of the increased complexity of urban traffic networks. A traditional, one-size-fits-all approach is not inadequate in the face of diverse intersection characteristics and evolving traffic dynamics.

SUMMARY

This section provides a general summary of the disclosure and is not a comprehensive disclosure of its full scope or all of its features.

The present disclosure provides a system and method that recognizes the need for a more nuance and context-aware optimization methodology. In general, the system revolutionizes traffic signal optimization offering a solution that adapts to unique demands for each intersection and contributes to the overarching goal of creating smarter and more sustainable urban transportation systems by using the synergies of federated and reinforcement learning.

In one aspect of the disclosure, a method includes training local models associated with a roadside device to form sets of model parameters for controlling a portion of a roadway, each local model associated with a first model type or a second model type, communicating the sets of model parameters to either a first intermediate server coupled to a first plurality local models and a second intermediate server coupled to a second plurality of intersections, aggregating model parameters for each type of local model to form first aggregated parameters for the first model type and second aggregated parameters for the second model type at the first intermediate server, aggregating model parameters for each type of local model to form third aggregated parameters for the first model type and fourth aggregated parameters for the second model type at the second, communicating the first aggregated parameters and the second aggregated parameters from the first intermediate server to a central server, communicating the third aggregated parameters and the fourth aggregated parameters from the second intermediate server to the central server, aggregating the first aggregated parameters and the third aggregated parameters to form first global parameters, aggregating the second aggregated parameters and the fourth aggregated parameters to form second global parameters, communicating the first global parameters and the second global parameters to the local models and operating the roadside devices with the first global parameters or the second global parameters.

In another aspect of the disclosure, a system comprises a plurality of local models associated with a roadside device having sets of model parameters for controlling a portion of a roadway. Each local model is associated with a first model type or a second model type. A first plurality local models and a second plurality of local models receive the sets of model parameters. A first intermediate server is programmed to aggregate model parameters for each type of local model to form first aggregated parameters for the first model type and second aggregated parameters for the second model type at the first intermediate server and communicate the first aggregated parameters and the second aggregated parameters to a central server. A second intermediate server is programmed to aggregate model parameters for each type of local model to form third aggregated parameters for the first model type and fourth aggregated parameters for the second model type and communicate the third aggregated parameters and fourth aggregated parameters to a central server. The central server is programmed to aggregate the first aggregated parameters and the third aggregated parameters to form first global parameters, aggregate the second aggregated parameters and the fourth aggregated parameters to form second global parameters and communicate the first global parameters and the second global parameters to the local models. The roadside devices are programmed to operate with the first global parameters or the second global parameters.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
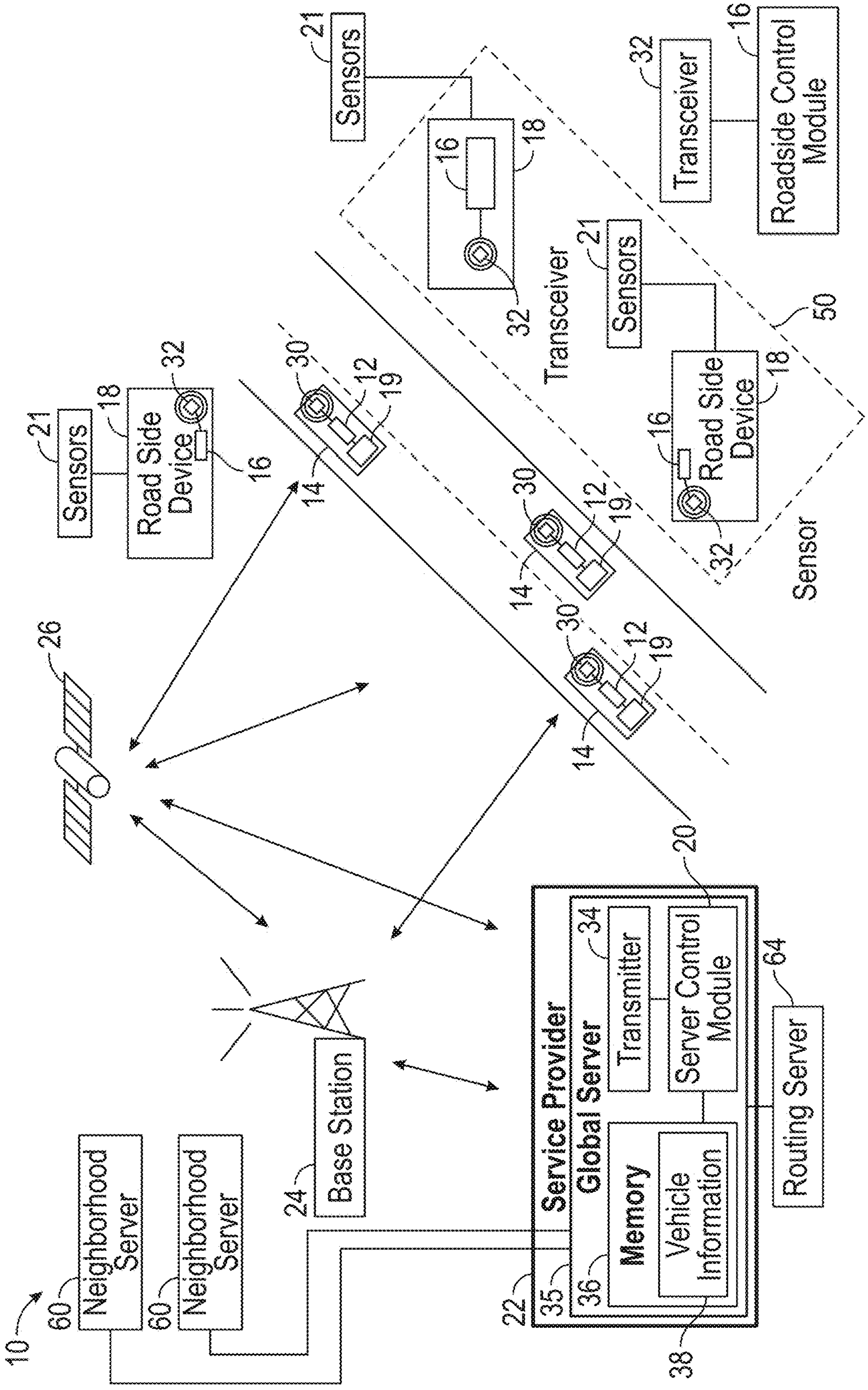
FIG. 1 is a functional diagram of a driver assistance system with reinforcement and federated learning according to the present disclosure.

Example embodiments will now be described more fully with reference to the accompanying drawings.

Recent intelligent vehicles include various sensors and communication devices, which are used to understand host vehicle behavior, driver behavior, and behavior of other vehicles. Driver assistance is provided based on outputs of the sensors, current operating conditions, and a detected operating environment. For example, a steering wheel angle, a brake pedal position, and an accelerator pedal position may be monitored to determine driver behavior while external radar sensor signals and camera images may be monitored to detect a current vehicle environment, which may include other vehicles. As an example, location and movement of lane markers, surrounding objects, signal lights, etc. may be monitored. Driver assistance may be provided to, for example, autonomously steer, brake and/or decelerate the corresponding host vehicle to prevent a collision.

A modular artificial intelligence (AI) system of a vehicle may perform autonomous actions and operate a vehicle to, for example, merge from a first lane of traffic into a second lane of traffic. A modular AI system is an AI system that is applicable to various vehicle environments and follows a set of rules to predict movement (e.g., travel path, speed, acceleration, etc. of nearby vehicles relative to a host vehicle).

Autonomous driving in past years is a leading focus point in the automotive research field and driving in urban and highway traffic is complex. Given the statistics indicating that the number of fatalities in traffic accidents in the last 10 years is 1.2 million per year, autonomous driving is expected to save millions of lives in the future. Apart from orthodox techniques and in order to provide a vehicle with some self-built intelligence, several machine learning (ML) techniques have been introduced, which allow a driving agent to learn from gathered data and improve future operations based on determined experiences. A "driving agent" or "agent" as used herein may refer to a vehicle, a vehicle control module, a driver assistance module, a RLP module, a simulation system control module, a simulated vehicle control module, or other autonomous vehicle module. An agent may refer to a combination of two or more of the stated modules. Current autonomous methods include vehicle individualized intelligence without collaboration that focus operations based on sensory inputs.

The examples provided herein include collaborative multi-agent reinforcement learning. This may be implemented, for example, on a highway, freeway, roadway, or other multi-vehicle environment. The collaborative multi-agent reinforcement learning approach may also be implemented in an actual vehicle environment, in a simulated environment, or other multi-agent environment where multiple agents are able to interact. Each of the agents is able to learn behaviors of that agent and/or corresponding vehicle and behaviors of the other agents and/or corresponding vehicles. The stated behaviors are learned over time based on feedback data, sensor data, and shared data collected in association with different environment states and performed actions. Collaborative systems are disclosed in which the agents share data about the environment and decision making information and based on this information decide on a best course of action to take next. This includes avoiding obstacles, pedestrians and rogue vehicles, which may be un-instrumented and/or non-autonomous vehicles. This aids in preventing a collision. The collaborative systems include teaching agents to drive autonomously and collaboratively in certain scenarios, such as highway scenarios.

The disclosed agents perform collaborative real-time decision making and path planning using trained and continuous learning artificial intelligence (AI) systems to prevent single and series collisions. A single collision refers to a collision between two vehicles. A series collision refers to a multiple consecutive collisions between more than two vehicles, sometimes referred to as a "traffic pile up" which is reduced traffic flow. Certain traffic conditions may be mixed such that the traffic includes autonomous vehicles, partially autonomous vehicles, and/or non-autonomous (manually driven) vehicles. Other traffic conditions may include only fully autonomous vehicles that are fully connected (i.e. able to communicate with each other and share information).

In the disclosed examples, a RLP algorithm (also referred to as a multi-agent collaborative deep Q network (DQN) with prioritized experience replay (PER) algorithm) is disclosed that provides intelligence for behavior prediction of surrounding vehicles and negotiated path prediction and planning for collision avoidance in automated vehicles. The RLP algorithm is used to facilitate autonomous vehicle learning and predicting of vehicle behaviors and potential driving paths of the vehicles in a particular environment (or local traffic scenario). The prediction of vehicle behaviors and driving paths may be for any number of vehicles in a driving scenario.

The disclosed implementations also include a reinforcement learning (RL) architecture for collaborative, multi-agent planning which is useful for control of spatially distributed agents in a noisy environment. Collaborative driving is needed for future autonomous driving where several autonomous vehicles are in proximity of each other and are sharing state information, action information, decision information, etc. with each other for informed decision making in real time. Complete state information and intended actions of all of the autonomous vehicles in an environment and position information of non-autonomous vehicles may be shared with each autonomous vehicle. In this scenario, the autonomous vehicles are capable of driving collaboratively with each other while evading the non-autonomous vehicles. These maneuvers may be aggressive. The autonomous vehicles are able to learn from experiences of each other and perform better actions over time.

The driver assistance network may be a dedicated short range communication (DSRC) network, a cellular vehicle-to-everything (C-V2X) network, or other vehicle information sharing network including V2X communication. As an example, the DSRC network may be a 1-way or 2-way short to medium range wireless communication system using 75 mega-hertz (MHz) of spectrum in a 5.9 giga-hertz (GHz) band, which is allocated for transfer of automotive information.

Although the disclosed figures are primarily described with respect to vehicle implementations, the systems, modules, and devices disclosed herein may be used for other applications, where artificial intelligence decisions are made, and course of actions are selected. The examples may be utilized and/or modified for various neural networks.

Roadside devices may also be controlled and coordinated with the control of vehicles to reduce conflicts. By controlling timing, roadside devices can position traffic in a coordinated manner.

Referring to FIG. 1, a driver assistance network 10 in a mixed autonomous operating environment is illustrated. The driver assistance network 10 may include various vehicle communication devices (or devices that transmit vehicle related information), such as vehicle control modules 12 of vehicles 14, roadside control modules 16 of roadside units (or roadside devices) 18, a server control module 20 of a service provider 22, and/or other vehicles communication devices, such as communication devices in a base station 24 or a satellite 26. The vehicle related information may include messages and/or signals including information pertaining to the vehicles 14 and/or objects within predetermined distances of the vehicles 14. As an example, a central or global server 35 may be implemented as a cloud-based server and the server control module 20 may be implemented as a RLP module. A portion of and/or a version of the RLP algorithm described below may be implemented by each of the vehicle control modules 12, roadside control modules 16, and the server control module 20. In addition, one or more levels of the RLP architecture disclosed herein may be implemented by the vehicle control modules 12, roadside control modules 16, and the server control module 20.

The vehicles 14 include the vehicles control modules 12 and transceivers 30 for vehicle-to-vehicle communication and communication with the other vehicle communication devices, such as communication with transceivers 32, 34 of the roadside devices 18 and the service provider 22. The vehicles 14 may also include sensor 19 such as cameras, lidar, radar, speed sensors. The roadside devices 18 may also include sensors 21 such as cameras or other devices to obtain geographic positions of objects. The service provider 22 may include the central or global server 35, which includes the server control module 20, the transceiver 34, and a memory 36. The memory 36 may store vehicle information 38, such as that described herein, which may be shared with the vehicles 14. The roadside devices 18 may be referred to as a "facility" and may be a traffic light or other device to aid vehicles.

The roadside devices 18 may be coupled together and referred to as a corridor 50. Each individual roadside device 18 may include control modules 16 that have models stored therein. The models may be different model types, such as model A, model B and the like. The models may have the same neural network structure, but may be trained with different data because of the physical differences of the road. Various roadside devices 16 may be grouped together in the corridor 50. That is, the roadside devices may act together and therefore may not include a separate model but one model to control the operation of each of the roadside devices within the corridor 50. For example, on a certain stretch of road, the traffic signals may be synchronized for a long distance. These synchronized traffic lights may be part of the same corridor 50. The corridors 50 may include their parameters collectively. A number of roadside devices may be in communication with neighborhood servers 60. The operation of the neighborhood servers 60 includes the aggregating of parameters from various facilities or roadside devices 18 and corridors 50. The neighborhood servers 60 may serve a particular geographic region in proximity to the neighborhood server. In this example, two neighborhood servers 60 are illustrated. However, various numbers of neighborhood servers may be used in a system 10. The number of facilities and/or corridors that are in communication with each neighborhood server may vary as well. The neighborhood server 60 may be in communication with the global server 35. The global server 35 may be used to aggregate parameters and rewards from the neighborhood servers 60 as will be described in greater detail below.

A routing server 64 may be coupled to the service provider 22. Emergency vehicles or other types of vehicles may be in communication with the routing server 64 to obtain a planned routes according to a routing request and parameters within the global server 35 to form real time routing decisions. The routing server 64 may be incorporated within the service provider 22 although the routing server 64 is shown as a separate component. The routing server 64 and the neighborhood server 60, as well as the roadside devices 18 and the road users 14, all intercommunicated through various devices such as the bay station 24 and/or the satellite 26.

Figure 2:
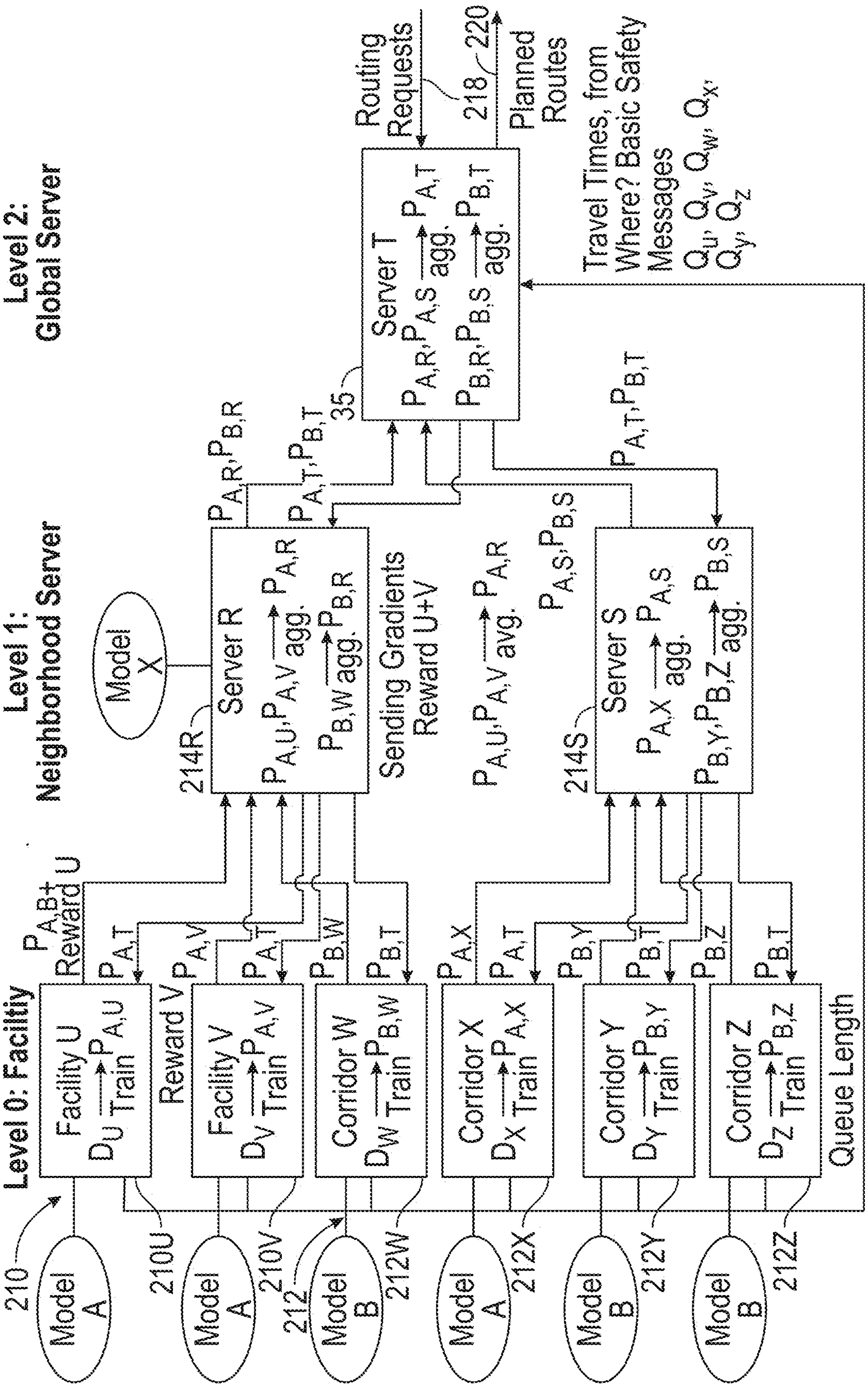
FIG. 2 is high level diagrammatic view of the facility level, neighborhood level and global level of the system.

Referring now to FIG. 2, the different portions of the system are divided by 'levels". At level zero are the "facilities" (collectively referred to as 210) which correspond to either a roadside device or corridor having a plurality of roadside devices. In this example, two facilities 210U and 210V are set forth. Each facility corresponds to a first type of model, model A. A corridor 212W, 212X, 212Y and 212Z (refereed to collectively as 212) are also set forth. In this example, corridor 212W corresponds to a second model type, model B. Corridor 212X corresponds to the first model type, model A, and corridor 212Y corresponds to model B. Another corridor 212Z corresponds to corridor Z and model B. Each of the facilities 210 and the corridors 212 may be locally trained with local data. As mentioned above, the need to prevent the individual data from being communicated to the other facilities and corridors is present. In this manner, parameters P for the models and rewards for the models are generated but do not have the training data or the data from the facility or corridor therein. That is, while the parameters are based on the data, the parameters do not reveal the underlying actual data. The parameters may also be referred to as gradients which may be ultimately based on traffic conditions. The facility 210U generates parameters $P_{A,U}$. Facility V generates parameters $P_{A,V}$. Corridor 212W generates parameters $P_{B,W}$. Corridor 212X generates parameters $P_{A,X}$. Corridor 212Y generates parameters $P_{B,Y}$. Corridor 212Z generates parameters $P_{B,Z}$. The first letter of the subscript corresponds to the model type and the second letter of the subscript corresponds to the facility or corridor letter. Rewards are also generated at each of the facilities or corridors generated in real time. The rewards refer to a positive or negative real-time feedback through interaction with the environment. The rewards may be defined as a loss function as to how well the model for each of the facilities/corridors are performing with data.

At the second level, a plurality of intermediate servers, server 214R and server 214S are set forth. The servers 214R and 214S are communication with different facilities and corridors from level zero. In this example, server 214R is in communication with facility 210U, facility 210V and corridor 212W. The servers 214R and 214S are located in a relatively close geographic proximity or region to the facilities and corridors to minimize the amount of communication and the distance for communicating various parameters. The servers 214R and 214S are referred to herein as Level 1 "neighborhood servers' due to the proximity to certain facilities/corridors. The server 214S is in communication with corridor 212X, corridor 212Y and corridor 212Z. Federated learning is used by the servers 214R and 214S in that the parameters and rewards that are communicated from respective facilities and corridors do not provide specific data by rather the general overall parameters for the model. As mentioned above, the rewards may also be communicated to the models. An aggregation takes place with the model parameters from the same type of models and may be based on traffic condition (flow) data and other sensed data from the road users and roadside devices. In this example, facility 210U and 210V are aggregated together to form a first set of aggregated data parameters $P_{A,R}$. Likewise, server S aggregates data from the corridors 212Y and 212Z as parameters $P_{A,S}$. Of course, the model B parameters and the model A parameters are provided from the servers 214R and 214S.

Ultimately, the aggregated parameters and the other parameters are provided from the servers 214R, 214S to a central or global server 35. Another aggregation takes place with the parameters that were provided from level 1, servers 214R, 214S. Parameters of the same model type (A, B in this example) are aggregated together. That is, in this example, parameters $P_{A,R}$ are aggregated with parameters $P_{A,S}$ while parameters for the second type of model, parameters $P_{B,R}$ and parameters $P_{B,S}$ are aggregated together to form global parameters PAT and parameters $P_{B,T}$. The global parameters $P_{A,T}$ and parameters $P_{B,T}$ are ultimately communicated back to the server 214R and server 214S and ultimately back to the facilities and corridors 210U-212Z. In this manner, the parameters from all the different facilities or corridors are having the same model are aggregated together at the global server so that controlling of a roadside device 18 of FIG. 1 may be performed such as one of the facilities 210U, 210V or corridors 212W, 212Z. Federated learning is also used at the global server 35 because, once again, the underlying data from the facility or corridor is not specifically known but rather the parameters are provided. The parameters as mentioned above may include rewards.

It should be noted that the models at the facilities and corridors within the servers 214R and 214S and the global server 35 may be neural networks such as deep neural networks (DNN) that are trained with specific data. The facilities and corridors are trained with data for the specific intersection and the training of which may take place over a time period. Server 35 may also be used for routing requests. As illustrated. routing requests 218 may be provided to the server T and planned routes 220 may be generated by the server T based upon the global parameters aggregated from the servers 214R, 214S which are aggregated from the facilities 210U, 210V and corridors 212W-212Z, which include feedback of the traffic condition data such as traffic flow It should be noted that by grouping intersections into neighborhoods, long distance communication costs and latency may be reduced. At each of the neighborhood servers 60, parameters are received from the roadside devices which are aggregated from the model type based on data such as traffic condition data.

The routing of vehicles may be performed by emergency vehicles between a specific origin and a destination. Ultimately, the server 35 may provide a path with a planned route between the origin or requestor and a destination.

Figure 3:
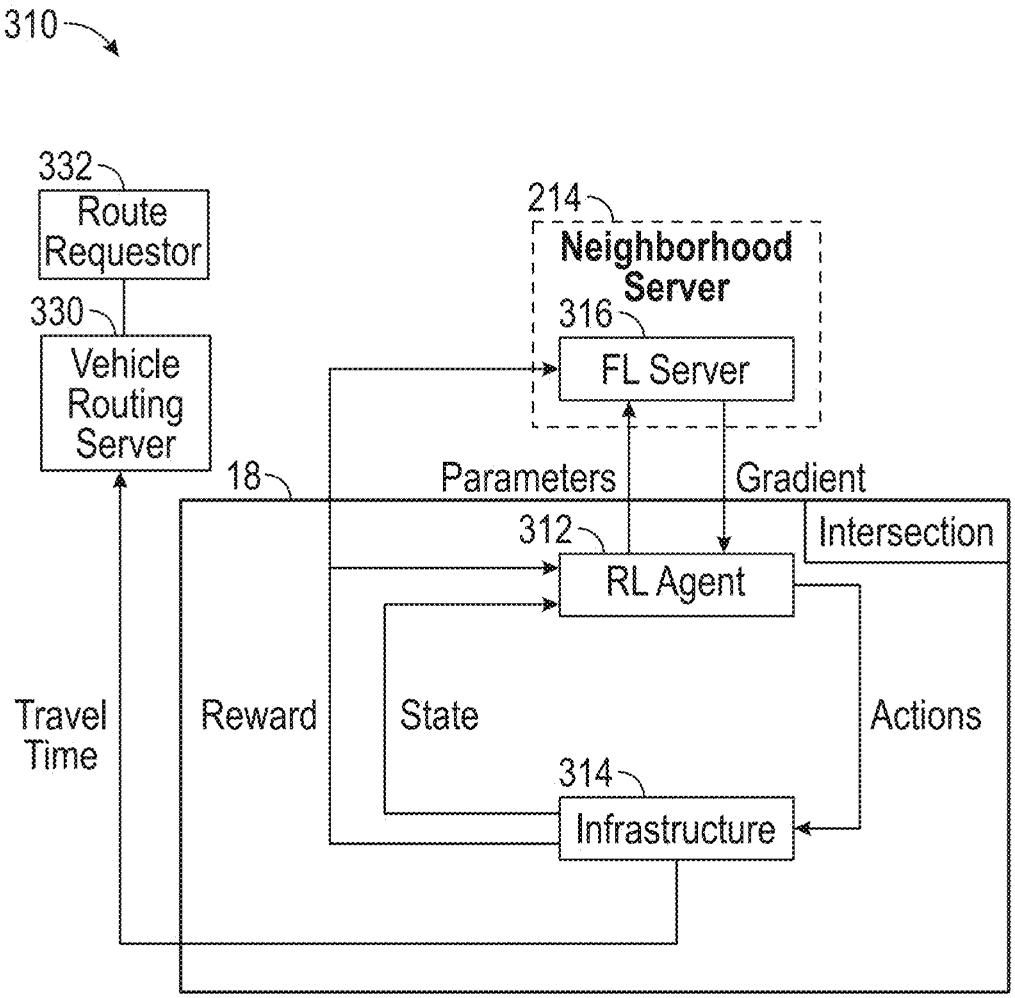
FIG. 3 is a block diagrammatic view of the training system of the present system.

Referring now to FIG. 3, a training system 310 is illustrated. The training system shows an intersection which corresponds to one of the roadside devices 18 illustrated in FIG. 1. The roadside device 18 has a reinforcement learning agent 312 and an infrastructure block 314. The reinforcement learning agent uses reinforcement learning to train the model of the facility or corridor illustrated in FIG. 2. The neighborhood server 214 may be one of the servers 214R or 214S illustrated above. The neighborhood server 214 has a federated learning server 316. Ultimately, the intersections 18 may be grouped by similar intersection characteristics such as physical layouts, behaviors or patterns. The basic types of intersections relating to a number of bounds or characteristics are set forth. The intersections of the same type may be divided into sub types based upon on different traffic behavior. Federated learning works well for cases with similar samples but different features. In this example, intersections with the same type of model are provided with the denotation "A" or "B".

The infrastructure 314 generates various types of observation data from the overall system. The infrastructure uses observations from cameras and/or speed sensors or the like in order to train the agent 312. That is, various states are provided to the reinforcement learning agent 312. Also, rewards are provided by the infrastructure 314 to both the reinforcement learning agent 312 and the federated learning server 316. The federated learning server 316 may be part of one of the neighborhood servers 214R, 214S or the global server 35. Parameters are provided from the reinforcement learning agent 312 to the federated learning server 316 while gradients are provided back to the reinforcement learning agent. Ultimately, the parameters are updated at federated learning server 316 and the global parameters that are communicated back from the global server and the neighborhood server to the facility level, level zero and the facilities and corridors therein. The infrastructure 314 also provides data to a vehicle routing server 330. Vehicle routing server 330 is provided with parameters. As mentioned above, the vehicle routing server may be central or global server 35. Travel times may be generated by the vehicle routing server that are providing to a route requestor 332. That is, a routing request from the routing requestor 332 may be provided to the vehicle routing server 330 from which planned routes are generated from the data from the various facilities and corridors. That is, the global parameters from the server 35 are ultimately used to provide the routing request. More specifically, the central server 35 is programmed to prioritize global parameters based on current road conditions, with higher priority given to congested intersections.

Figure 4:
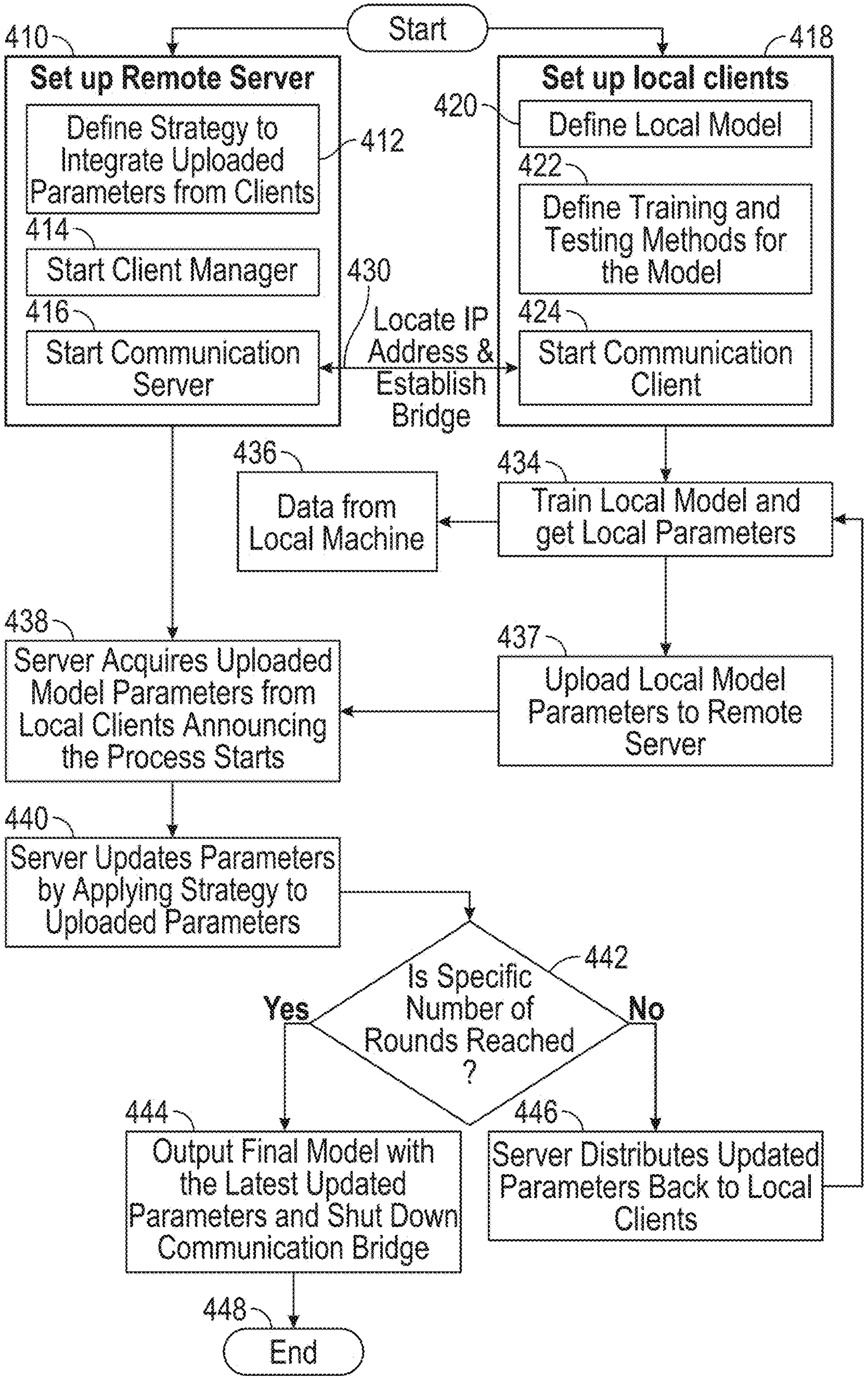
FIG. 4 is a flowchart of a method for training the system.

Referring now to FIG. 4, a method for operating the federated learning flow is set forth. In step 410, the remote server is set up using a plurality of steps. In step 412, the strategy to integrate uploaded parameters from the client is set forth. A client manager may be started in step 414 for the remote server. The starting of a communication server is set forth in step 416. The system also sets up "clients" at step 418. The clients are used to define a local model at step 420. In step 422, the training and testing methods for the model are defined. The training is performed prior to and during a training process. In step 424, a communication client is started. The IP addresses are located, and a communication bridge is established in step 430.

After the setting up of the local clients, step 434 trains local models and gets local parameters, data is provided to step 434 from a local machine in step 436. That is, the data from the local machine is the data from the roadside devices that are used to train the local parameters. Operating data such as the signal timing and the like may be used. After step 434, step 437 uploads the local parameters to the remote neighborhood servers 214R, 214S in FIG. 2. Step 438 is performed after the setting up of the remote server and after step 437. In step 438, the server requires updated model parameters from the local clients and announces the start of the process. In step 440, the server updates the parameters by applying strategies to the uploaded parameters. For example, step 440 aggregates the various parameters from the same types of models to provide updated parameters such as traffic condition data. The adjusting of the model parameters may be based on real-time traffic data received from vehicle sensors and roadside devices. The remote server process is performed not only at the neighbor server level, level one in FIG. 2, but also at the global server level, level 2. Federated learning is used since only the parameters are provided and the raw data from each of the corridors or facilities are not specifically used. Global parameters may be prioritized based on current road conditions, with higher priority given to congested intersections.

Training takes place using a number of training rounds to allow the model to provide accurate results and ensuring real-time adaptation to traffic flow. When a specific number of rounds has been reached in step 442, the final model with the last updated parameters is shut down in step 444 and a communication bridge established in step 430 is ceased. In step 442, when the specific number of rounds has not been reached, step 446 distributes updated parameters back to the local clients and further training takes place in step 434. Training may take place for a specific amount of time to allow accurate predictions of the area. The system ends in step 448 after step 444.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set. In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules that are connected via the communications system. For example, multiple modules may implement the same functionality distributed by a load balancing system. In a further example, the functionality of the module or controller may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method comprising:

training local models associated with a roadside device to form sets of model parameters and rewards for controlling a portion of a roadway, each local model associated with a first model type or a second model type;

communicating the sets of model parameters and rewards to either a first intermediate server comprising a neighborhood server coupled to a first plurality local models in a geographic region and a second intermediate server comprising a neighborhood server coupled to a second plurality of local models in a geographic region;

aggregating, at the first intermediate server, model parameters and rewards for each type of local model received from the first plurality local models to form first aggregated parameters for the first model type and second aggregated parameters for the second model type;

aggregating, at the second intermediate server, model parameters and rewards for each type of local model received from the second plurality of local models to form third aggregated parameters for the first model type and fourth aggregated parameters for the second model type;

communicating the first aggregated parameters and the second aggregated parameters from the first intermediate server to a central server;

communicating the third aggregated parameters and the fourth aggregated parameters from the second intermediate server to the central server;

aggregating the first aggregated parameters and the third aggregated parameters, based on rewards based on feedback of traffic condition data, and prioritize global parameters based on current road conditions, with higher priority given to congested intersections, to form first global parameters;

aggregating the second aggregated parameters and the fourth aggregated parameters, based on rewards based on feedback of traffic condition data, and prioritized global parameters based on current road conditions, with higher priority given to congested intersections, to form second global parameters;

communicating the first global parameters and the second global parameters to the local models; and operating the roadside devices with the first global parameters or the second global parameters.

2. The method of claim 1 wherein controlling the portion of the roadway comprises controlling an intersection or corridor, wherein the control is based on reinforcement learning models that optimize traffic signal parameters using real-time traffic data, and further wherein the reinforcement learning models are configured to prioritize traffic signal adjustments based on predicted congestion levels derived from historical traffic patterns, real-time sensor data, and a hierarchical optimization framework that incorporates multi-agent coordination across intersection groups.

3. The method of claim 1 wherein controlling the portion of the roadway comprises controlling a corridor comprising a plurality of roadside devices.

4. The method of claim 1 wherein communicating the sets of model parameters to either the first intermediate server or the second intermediate server comprises communicating the sets of model parameters to either the first intermediate server coupled to a first plurality of roadside devices, or the second intermediate server coupled to a second plurality of roadside devices.

5. The method of claim 1 further comprising establishing model types with roadside devices having similar intersection characteristics include behavior or physical layout.

6. The method of claim 1 wherein communicating the first global parameters and the second global parameters to the local models comprises communicating the first global parameters to models comprising the first model type and communicating the second global parameters to models comprising the second model type.

7. The method of claim 1 wherein communicating the first global parameters and the second global parameters to the local models comprises communicating the first global parameters and the second global parameters to models through first and second intermediate server.

8. The method of claim 1 further comprising generating a routing request from a vehicle and determining a route at the central server using the first global parameter and the second global parameters into real-time routing decisions.

9. The method of claim 1 wherein aggregating model parameters comprises aggregating gradients based on traffic conditions.

10. The method of claim 1 further comprising dynamically adjusting the model parameters based on real-time traffic data received from vehicle sensors and roadside devices.

11. The method of claim 1 generating a final model after a plurality of training rounds and continuously updating the local models using the final model, ensuring real-time adaptation to traffic flow.

12. A system comprising:

a plurality of local models associated with a roadside device having sets of model parameters and rewards for controlling a portion of a roadway, each local model associated with a first model type or a second model type;

a first plurality local models and a second plurality of local models receiving the sets of model parameters;

a first intermediate server is comprising a neighborhood server in a geographic region and programmed to aggregate model parameters and rewards for each type of local model received from the first plurality local models to form first aggregated parameters for the first model type and second aggregated parameters for the second model type and communicate the first aggregated parameters and the second aggregated parameters to a central server;

a second intermediate server is comprising a neighborhood server in a geographic region and programmed to aggregate model parameters and rewards for each type of local model received from the second plurality of local models to form third aggregated parameters for the first model type and fourth aggregated parameters for the second model type and communicate the third aggregated parameters and fourth aggregated parameters to a central server;

the central server programmed to aggregate the first aggregated parameters and the third aggregated parameters, based on rewards based on feedback of traffic condition data, and prioritize global parameters based on current road conditions, with higher priority given to congested intersections, to form first global parameters, aggregate the second aggregated parameters and the fourth aggregated parameters, based on rewards based on feedback of traffic condition data, and prioritize global parameters based on current road conditions, with higher priority given to congested intersections, to form second global parameters and communicate the first global parameters and the second global parameters to the local models; and the roadside devices programmed to operate with the first global parameters or the second global parameters.

13. The system of claim 12 wherein the portion of the roadway comprises a corridor comprising a plurality of roadside devices.

14. The system of claim 12 wherein first intermediate server is coupled to a first plurality of roadside devices and the second intermediate server is coupled to a second plurality of roadside devices.

15. The system of claim 12 wherein the model types having similar intersection characteristics include behavior or physical layout.

16. The system of claim 12 wherein the central server communicates the first global parameters to models comprising the first model type and communicates the second global parameters to models comprising the second model type, ensuring real-time adaptation to traffic flow.

17. The system of claim 12 wherein the central server communicates the first global parameters to models comprising the first model type and communicates the second global parameters to models comprising the second model type through first and second intermediate server.

18. The system of claim 12 wherein the model parameters comprise rewards based on real-time feedback.

* * * * *